United States Patent
Chia (10) Patent No.: US 10,265,658 B2
(45) Date of Patent: Apr. 23, 2019

(54) ENERGY-SAVING WATER PURIFYING SYSTEM

(71) Applicant: ETEN TECHNOLOGY LTD, Burnaby, British Columbia (CA)

(72) Inventor: Hui-Tsu Chia, Burnaby (CA)

(73) Assignee: ETEN TECHNOLOGY LTD., Burnaby, British Columbia (CA)

(*) Notice: Subject to any disclaimer, the term of this patent is extended or adjusted under 35 U.S.C. 154(b) by 297 days.

(21) Appl. No.: 15/262,360

(22) Filed: Sep. 12, 2016

(65) Prior Publication Data

US 2018/0071685 A1    Mar. 15, 2018

(51) Int. Cl.
| | |
|---|---|
| *B01D 61/06* | (2006.01) |
| *B01D 61/10* | (2006.01) |
| *C02F 103/08* | (2006.01) |
| *C02F 1/44* | (2006.01) |
| *B01D 61/00* | (2006.01) |

(52) U.S. Cl.
CPC .............. *B01D 61/10* (2013.01); *B01D 61/06* (2013.01); *C02F 1/441* (2013.01); *B01D 2313/243* (2013.01); *B01D 2313/246* (2013.01); *C02F 2103/08* (2013.01); *C02F 2201/005* (2013.01)

(58) Field of Classification Search
CPC .. B01D 2313/243; B01D 61/08; B01D 61/10; C02F 2103/08; E21B 49/081
USPC ............. 210/414.2, 416.3, 652, 321.6, 257.2
See application file for complete search history.

(56) References Cited

U.S. PATENT DOCUMENTS

| 3,825,122 | A | * | 7/1974 | Taylor | .................... | B01D 61/06 |
|---|---|---|---|---|---|---|
| | | | | | | 210/134 |
| 4,367,140 | A | * | 1/1983 | Wilson | .................... | B01D 61/06 |
| | | | | | | 137/544 |
| 5,106,500 | A | * | 4/1992 | Hembree | ............. | B01D 29/117 |
| | | | | | | 210/266 |
| 5,628,198 | A | * | 5/1997 | Permar | .................. | B01D 61/06 |
| | | | | | | 62/123 |
| 6,017,200 | A | * | 1/2000 | Childs | .................... | B01D 61/06 |
| | | | | | | 417/404 |
| 6,203,696 | B1 | * | 3/2001 | Pearson | ................. | B01D 61/06 |
| | | | | | | 210/98 |
| 6,604,914 | B2 | * | 8/2003 | Pares Criville | ........ | B01D 61/06 |
| | | | | | | 417/313 |
| 7,492,544 | B2 | * | 2/2009 | Jeansonne | ............ | G11B 19/042 |
| | | | | | | 360/75 |

(Continued)

*Primary Examiner* — Ana M Fortuna
(74) *Attorney, Agent, or Firm* — Browdy and Neimark, P.L.L.C.

(57) ABSTRACT

An energy-saving water purifying system has a tube, two pistons, a movable component, a pump, and a filter. The two pistons are mounted in the tube. The movable component is moveably mounted between two block portions of the tube. Two magnetic elements are mounted on the movable component and repulse magnetic elements of the two pistons. The movable component selectively blocks one of two wastewater entrances of the tube. An outlet of the pump is connected to two check valves of the two inlets in parallel. An inlet of the filter is connected to two check valves of the two outlets in parallel. A wastewater exit of the filter is connected to the two wastewater entrances of the tube in parallel. The water purifying system is switched by magnetic force so that the structure is simplified, energy is saved, and cost and fault rate are decreased.

9 Claims, 11 Drawing Sheets

(56) References Cited

U.S. PATENT DOCUMENTS

| | | | | |
|---|---|---|---|---|
| 8,601,988 B2* | 12/2013 | Graef | .................... | F01B 11/007 |
| | | | | 123/46 H |
| 9,387,440 B2* | 7/2016 | d'Artenay | ............ | B01D 61/025 |
| 9,669,335 B2* | 6/2017 | Takahashi | ............ | B01D 29/117 |
| 2001/0017278 A1* | 8/2001 | Verde | .................... | B01D 61/06 |
| | | | | 210/321.66 |
| 2016/0177714 A1* | 6/2016 | Tao | ........................ | E21B 49/081 |
| | | | | 166/53 |

* cited by examiner

ENERGY-SAVING WATER PURIFYING SYSTEM

BACKGROUND OF THE INVENTION

1. Field of the Invention

The present invention relates to a system for desalinating brine or purifying water, especially to an energy-saving water purifying system.

2. Description of the Prior Arts

A conventional water purifying system has been provided for portability and for desalinating brine or purifying water. The conventional water purifying system has an electrical pump to push water or brine into a filter for desalinating brine or filtering water for making pure water. However, for convenience in portability, a volume of the conventional water purifying system is restricted, such that a capacity of a battery is also restricted and thereby production of pure water is limited. Thus, many manufacturers create various structures for the water purifying system to save power for increasing the production of pure water.

Figure 8:
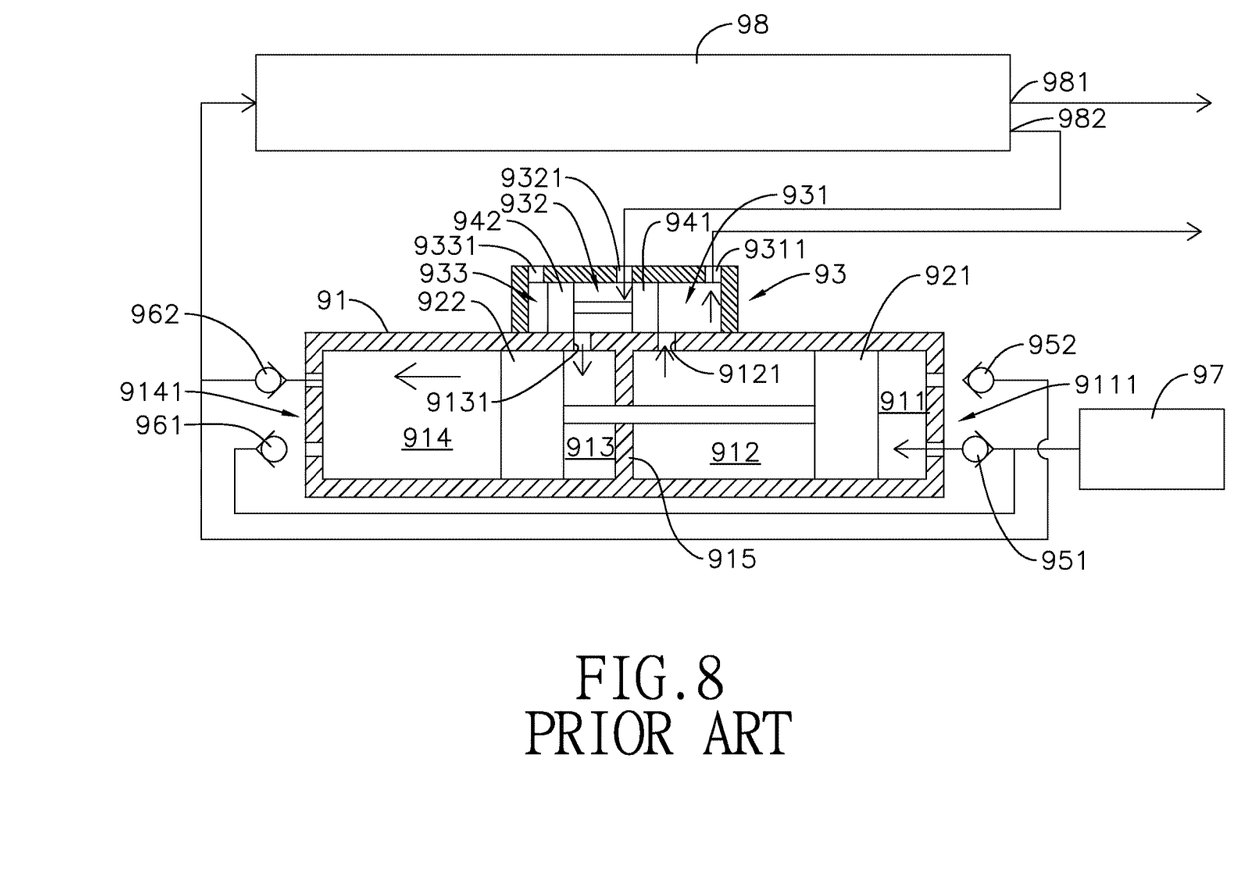
FIG. 8 is a sectional view of a first step of a process of using a conventional water purifying system.

Please refer to FIG. 8. One of the conventional water purifying systems comprises a tube 91, a first large piston 921, a second large piston 922, a wastewater controller 93, a first small piston 941, a second small piston 942, a first inlet electromagnetic valve 951, a first outlet electromagnetic valve 952, a second inlet electromagnetic valve 961, a second outlet electromagnetic valve 962, a high-pressure pump 97, and a filter 98.

The tube 91 has a middle wall 915 therein. A first space 911 is formed between a first end 9111 of the tube 91 and the first large piston 921; a second space 912 is formed between the first large piston 921 and the middle wall 915; a third space 913 is formed between the middle wall 915 and the second large piston 922; a fourth space 914 is formed between the second large piston 922 and a second end 9141 of the tube 9. Walls of the first space 911 and the fourth space 914 have an inlet and an outlet respectively, walls of the second space 912 and the third space 913 have a wastewater hole 9121 and a wastewater hole 9131 respectively. Cross-section areas of the large piston 921 and the large piston 922 are equal to each other, and the large piston 921 and the large piston 922 have the same magnetic pole (e.g. North Pole). The first large piston 921 is movably mounted between the first space 911 and the second space 912. The second large piston 922 is movably mounted between the third space 913 and the fourth space 914. The large piston 921 and the large piston 922 are connected by a rod so that the large piston 921 and the large piston 922 move synchronously. The wastewater controller 93 is mounted on an outer surface of the tube 91. A fifth space 931 is formed between one end of the wastewater controller 93 and the first small piston 941; a sixth space 932 is formed between the first small piston 941 and the second small piston 942; and a seventh space 933 is formed between the second small piston 942 and the other end of the wastewater controller 93. The second space 912 selectively communicates with the fifth space 931 or the sixth space 932 by wastewater hole 9121, and the third space 913 selectively communicates with the sixth space 932 or the seventh space 933 by wastewater hole 9131. A wastewater exit 9311 is disposed on a wall of the fifth space 931, a wastewater entrance 9321 is disposed on a wall of the sixth space 932, and a wastewater exit 9331 is disposed on a wall of the seventh space 933. Cross-section areas of the first small piston 941 and the second small piston 942 are equal to each other and the first small piston 941 and the second small piston 942 have the same magnetic pole attracted by the magnetic pole of the large piston 921 and the large piston 922 (e.g. South Pole). The first small piston 941 and the second small piston 942 are movably mounted in the wastewater controller 93 and connected by a rod so that the first small piston 941 and the second small piston 942 move synchronously. The first inlet electromagnetic valve 951 and the first outlet electromagnetic valve 952 are disposed out of the inlet and the outlet of the first space 911 respectively, and the second inlet electromagnetic valve 961 and the second outlet electromagnetic valve 962 are disposed out of the inlet and the outlet of the fourth space 914 respectively. The high-pressure pump 97 is connected to the inlet electromagnetic valve 951 and the inlet electromagnetic valve 961 in parallel, and the outlet electromagnetic valve 952 and the outlet electromagnetic valve 962 are connected to an inlet of the filter 98. The filter 98 has a filtrate exit 981 and a wastewater exit 982. The wastewater exit 982 is connected to the wastewater entrance 9321 of the wastewater controller 93.

Figure 9:
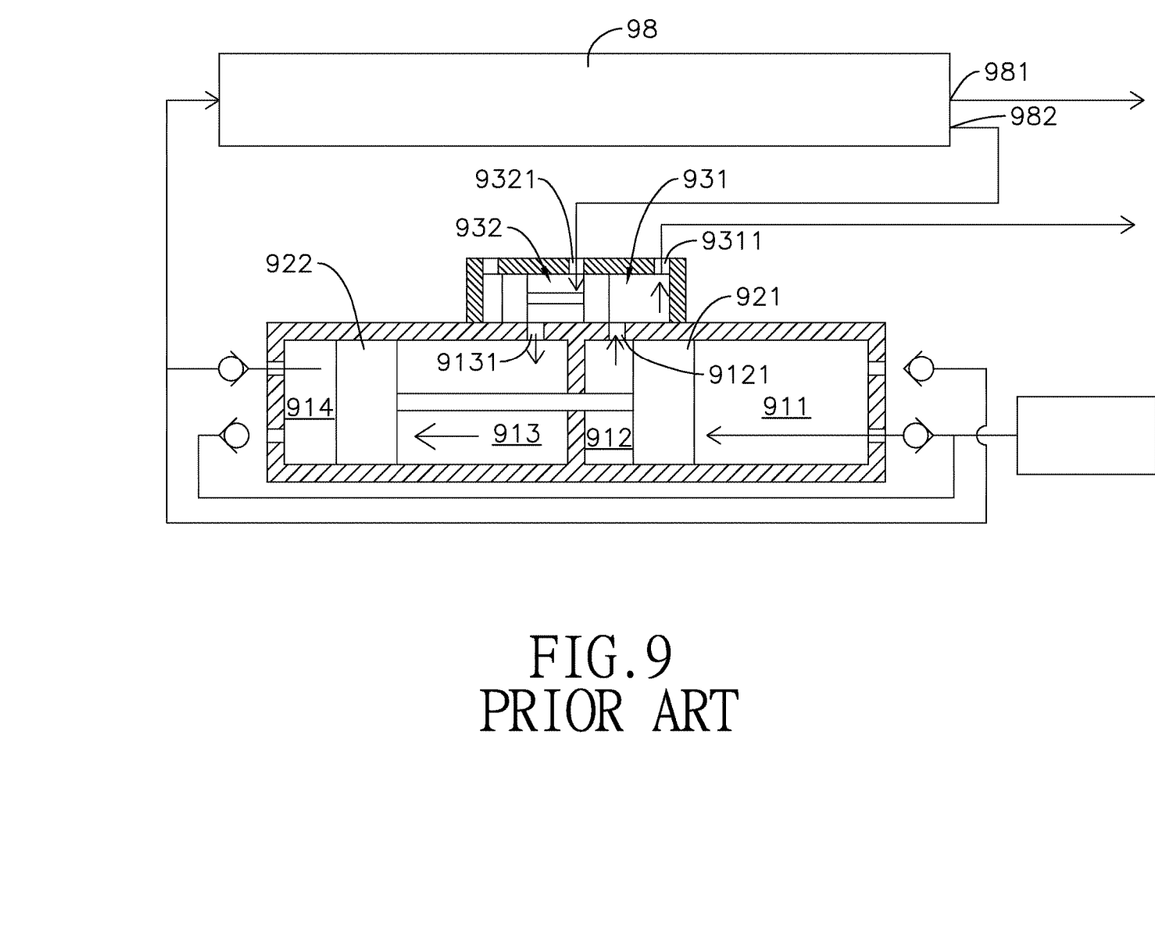
FIG. 9 is a sectional view of a second step of the process of using the conventional water purifying system in FIG. 8.
Figure 10:
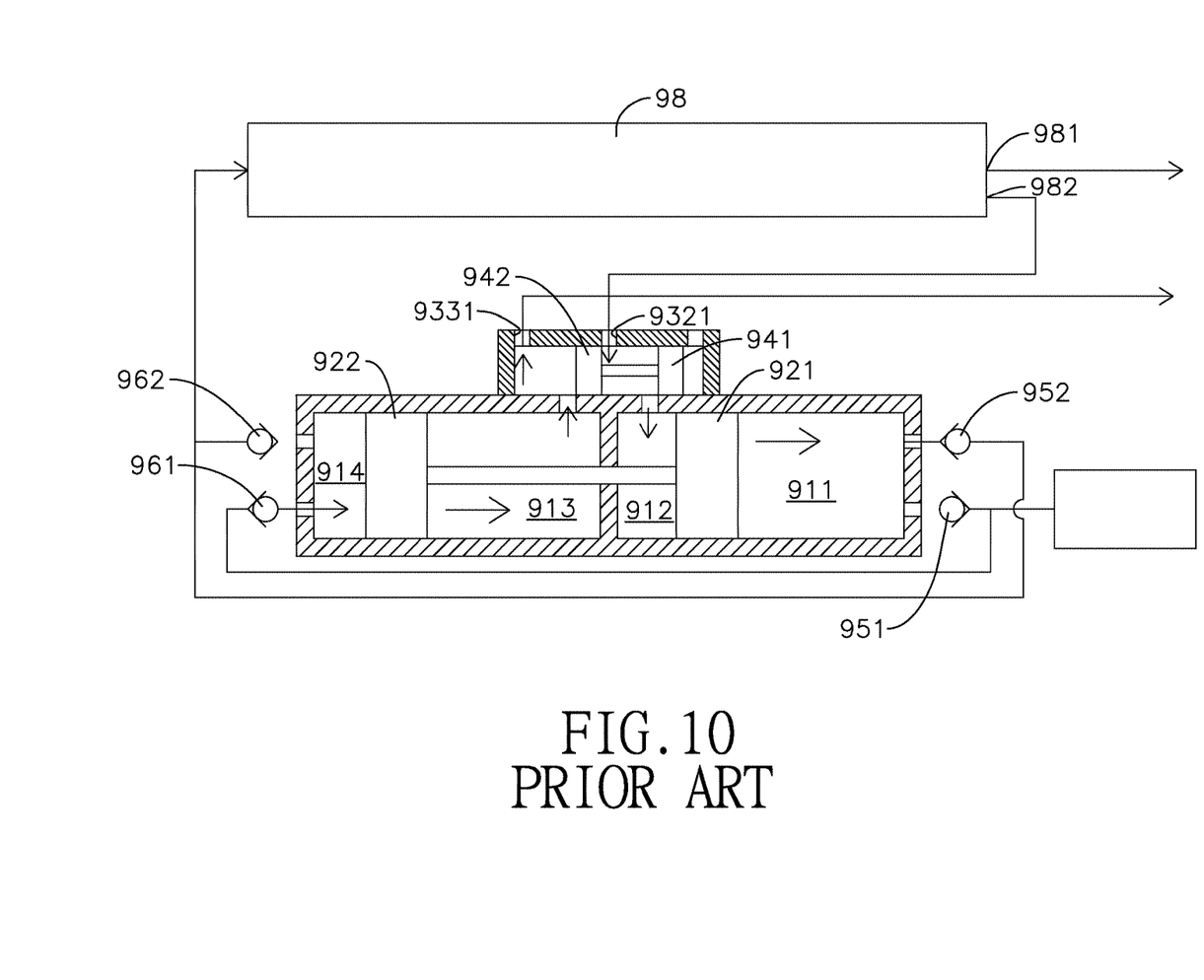
FIG. 10 is a sectional view of a third step of the process of using the conventional water purifying system in FIG. 8.
Figure 11:
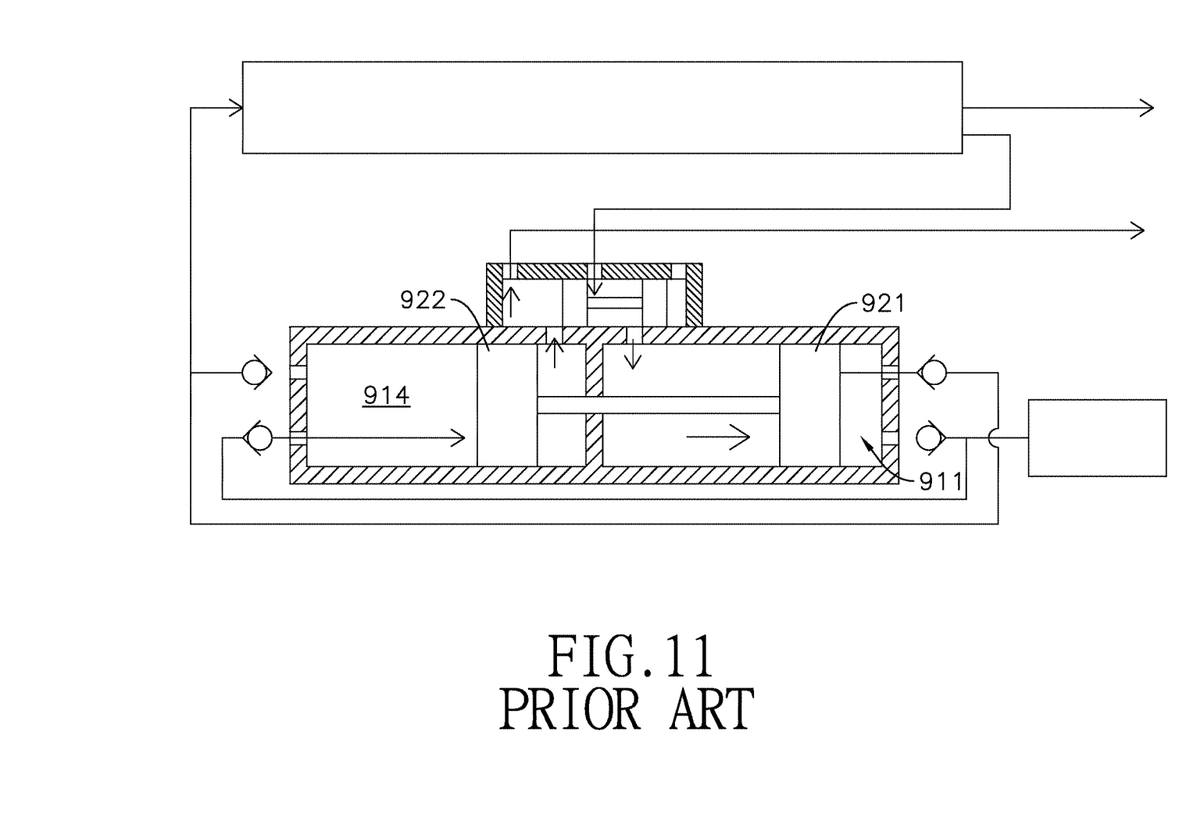
FIG. 11 is a sectional view of a fourth step of the process of using the conventional water purifying system in FIG. 8.

Please refer to FIGS. 8 and 9. When the conventional water purifying system is used, the high-pressure pump 97 draws out brine or water from the first inlet electromagnetic valve 951 to the first space 911 of the tube 91 and from the second inlet electromagnetic valve 961 to the fourth space 914. Because the cross-section areas of the first large piston 921 and the second large piston 922 are equal, the first large piston 921 and the second large piston 922 bear the same lateral pressure and do not move in the tube 91. After the seawater flows into the filter 98 through the first outlet electromagnetic valve 952 and the second outlet electromagnetic valve 962, part (about 25-30%) of the seawater turns into pure water and is discharged from the filtrate exit 981, and the remaining seawater turns into high-pressure wastewater and flows through the wastewater entrance 9321 of the wastewater controller 93 from the wastewater exit 982 and then into the sixth space 932. Then, the remaining seawater flows into the third space 913 from the wastewater hole 9131 on the left of the tube 91 so that the pressure in the tube 91 is changed, and thereby the second large piston 922 moves left to the fourth space 914 and drives the first large piston 921 to move left to the second space 912 in the same direction at the same time. Meanwhile, the seawater in the fourth space 914 is pushed into the filter 98 again by the second large piston 922 through the second outlet electromagnetic valve 962, and the seawater in the second space 912 can flow into the fifth space 931 through the wastewater hole 9121 and then flow out from the fifth space 931 through the wastewater exit 9311. When the first large piston 921 moves left to be adjacent to the first small piston 941, since the opposite poles attract each other, attracting force between the first large piston 921 and the first small piston 941 can drive the first small piston 941 to move right to the fifth space 931, which causes the small piston 941 and the small piston 942 to move along different directions. Besides, as FIGS. 10 and 11 show, it also drives the second small piston 942 to move right to the sixth space 932. Meanwhile, the high-pressure wastewater that has flowed through the wastewater entrance 9321 can flow into the second space 912 through the sixth space 932 and the wastewater hole 9121 so that the pressure in the tube 91 is changed, which makes the first large piston 921 move right to the first space 911, and drives the second large piston 922 to move to the third space 913. Therefore, the seawater in the first space 911 flows to the filter 98 through the first outlet electromagnetic valve 952, and the low-pressure seawater in the third space 913 flows into the seventh space 933 through the wastewater hole 9131 and flows out through the wastewater exit 9331. After the aforesaid process is repeated again and again, the high-pressure wastewater discharged from the wastewater exit 982 of the filter 98 may push the large piston 921 and the large piston 922, which causes the seawater in the first space 911 and the fourth space 914 to be driven into the filter 98 so that the energy consumption of the high-pressure pump 97 is decreased.

However, a structure of the aforesaid water purifying system is complicated. For example, it is difficult to design mechanisms of the wastewater controller 93, the small piston 941, and the small piston 942 and manufacture cut-off parts on the tube 91 and the wastewater controller 93 for connecting. Thus, the cost of the conventional water purifying system is high, and its service life is short.

To overcome the shortcomings, the present invention provides an energy-saving water purifying system to mitigate or obviate the aforementioned problems.

SUMMARY OF THE INVENTION

The main objective of the present invention is to provide an energy-saving water purifying system that can save energy, lower the cost, and decrease failure rate.

The energy-saving water purifying system has:
a tube comprising:
  a first block portion protruding from an inner surface of the tube;
  a second block portion protruding from the inner surface of the tube and spaced from the first block portion in an axial direction of the tube;
  a first wastewater entrance disposed through a side wall of the tube in a radial direction of the tube and between the first block portion and the second block portion;
  a second wastewater entrance disposed through the side wall in the radial direction and between the first block portion and the second block portion;
  a first inlet disposed at a first end of the tube;
  a first outlet disposed at the first end of the tube;
  a second inlet disposed at a second end of the tube which is opposite the first end of the tube; and
  a second outlet disposed at the second end of the tube;
a first piston movably mounted between the first block portion and the first end, the first piston comprising
  a magnetic element mounted on a surface of the first piston that faces to the first block portion;
a second piston movably mounted between the second block portion and the second end and comprising
  a magnetic element mounted on a surface of the second piston that faces to the second block portion;
a rod connected to the first piston and the second piston and movably passed through the movable component;
a movable component movably mounted between the first block portion and the second block portion, selectively abutting the first block portion or the second block portion, and selectively blocks the first wastewater entrance or the second wastewater entrance; the movable component comprising
  two magnetic elements mounted on two surfaces of two ends in an axial direction of the movable component respectively and selectively repulsed by the magnetic element of the first piston or the magnetic element of the second piston;
four check valves respectively connected to the first inlet, the first outlet, the second inlet, and the second outlet by multiple connecting conduits;
a pump comprising
  an outlet connected to the check valves of the first inlet and the second inlet in parallel by a pump conduit; and
a filter comprising
  an entrance connected to the check valves of the first outlet and the second outlet in parallel by a filter conduit;
a filtrate exit; and
a wastewater exit connected to the first wastewater entrance and the second wastewater entrance of the tube in parallel by a wastewater conduit;
wherein when the movable component abuts the first block portion, the movable component blocks the first wastewater entrance, and a wastewater in the filter flows into a space between the movable component and the second piston via the second wastewater entrance, thereby the wastewater pushing the first piston and the second piston to move toward the second end of the tube;
wherein when the movable component abuts the second block portion, the movable component blocks the second wastewater entrance, and a wastewater in the filter flows into a space between the movable component and the first piston via the first wastewater entrance, thereby pushing the first piston and the second piston to move toward the first end of the tube.

When the present invention is used, the first piston and the second piston separate the space in the tube into a first space and a second space. When the pump respectively drives the seawater or water into the first space and the second space from the first inlet and the second inlet, because the cross-section areas of the first piston and the second piston are equal and bear the same pressure of the pump, the first piston and the second piston are in a static state. After the seawater or water in the two spaces flows into the filter through the first outlet and the second outlet respectively, wastewater in the filter can flow back into the tube and, for example, between the movable component and the second piston for driving the second piston, which causes the second piston to move and saves energy. Besides, when the first piston is driven by the second piston and moves to be adjacent to the movable component, the magnetic element of the first piston and the magnetic element of the movable component repulse each other, thereby driving the movable component. Therefore, high-pressure wastewater in the filter alternatively flows into the movable component and the first piston for pushing the first piston reversely, and thereby the present invention is switched in direction so that the seawater or the water is pushed into the filter and is filtered. Thus, the present invention drives the two pistons by the high-pressure wastewater in the filter, which decreases 70% energy consumption of the pump. Besides, the present invention is switched by the repulsion of magnetic force so that the structure is simpler than the conventional electromagnetic valve, wastewater controller, and small piston, so the cost and the fault rate are decreased. Other objectives, advantages and novel features of the invention will become more apparent from the following detailed description when taken in conjunction with the accompanying drawings.

DETAILED DESCRIPTION OF THE PREFERRED EMBODIMENTS

Figure 1:
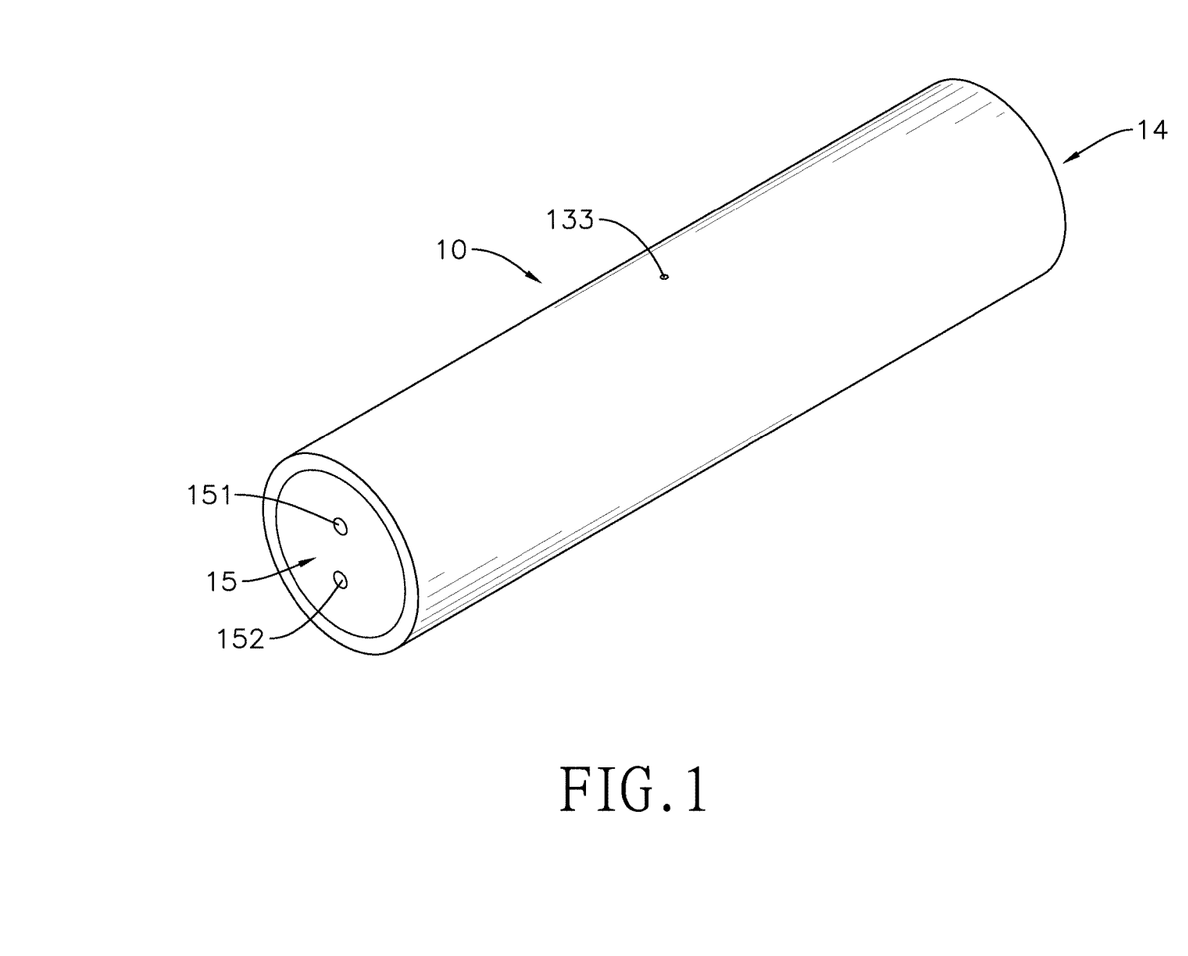
FIG. 1 is a perspective view of a tube of an energy-saving water purifying system in accordance with the present invention.
Figure 2:
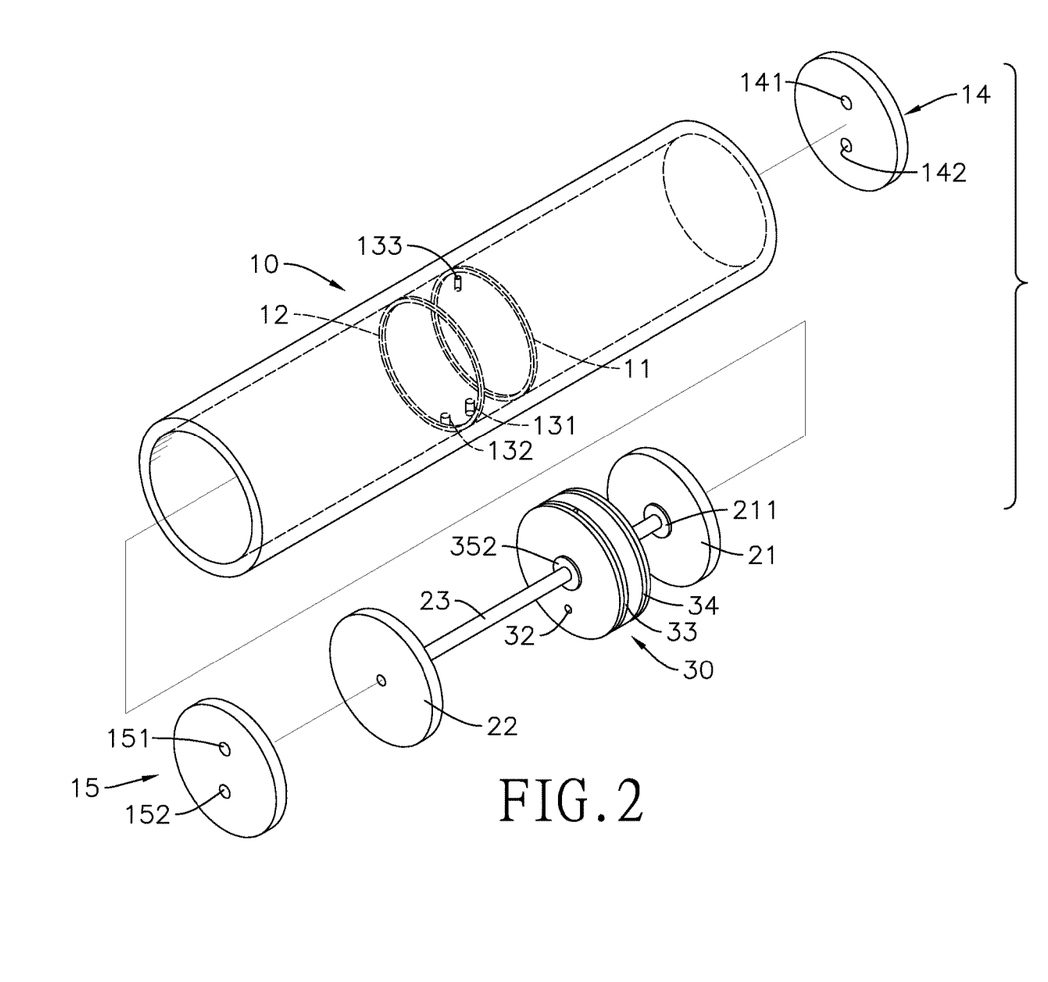
FIG. 2 is an exploded perspective view of the tube, two pistons, and a movable component of the water purifying system in FIG. 1.
Figure 4:
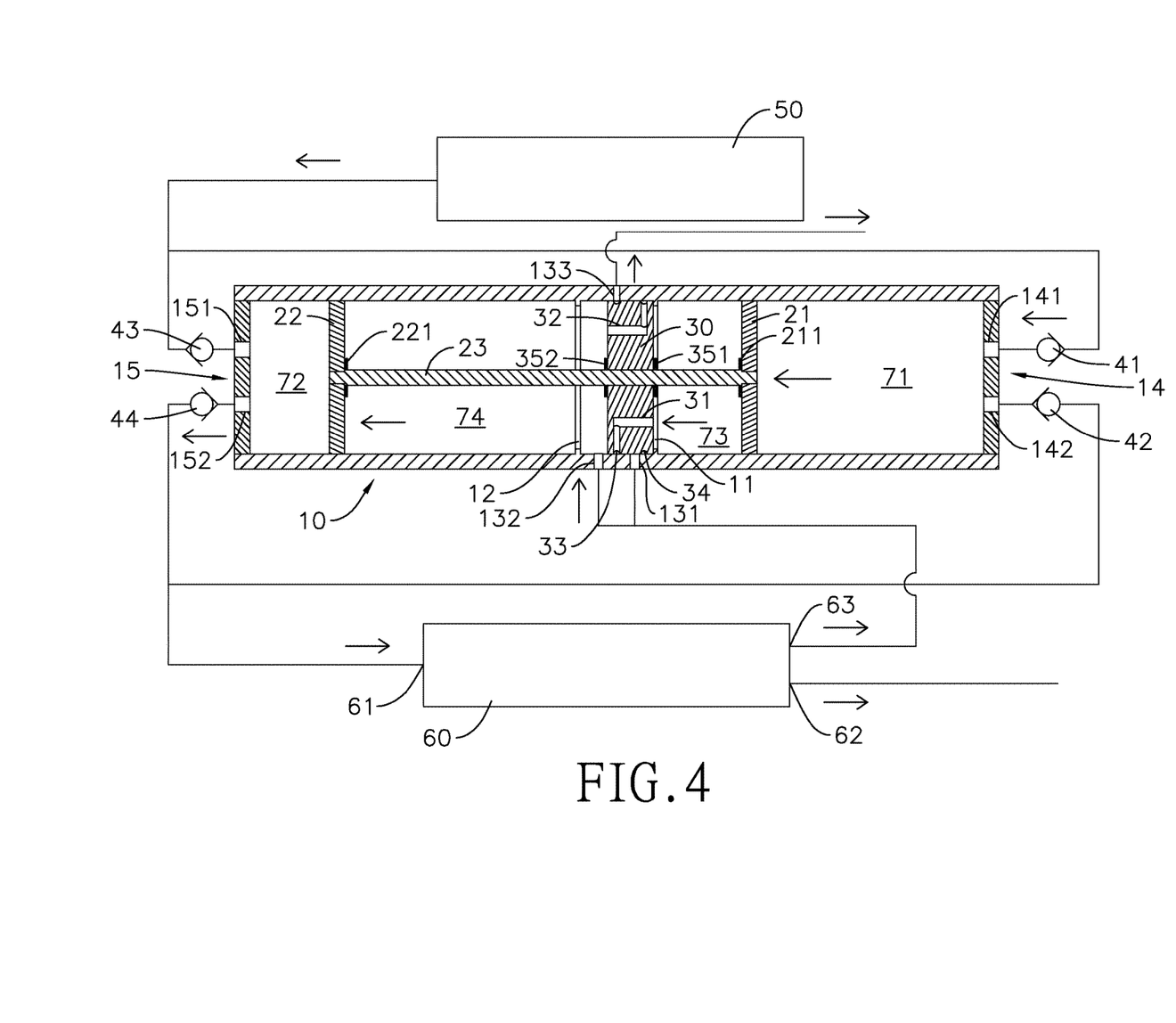
FIG. 4 is a sectional view of a first step of a process of using the water purifying system in FIG. 1.

With reference to FIGS. 1, 2, and 4, an energy-saving water purifying system in accordance with the present invention comprises a tube 10, a first piston 21, a second piston 22, a movable component 30, four check valves 41, 42, 43, 44, a pump 50, and a filter 60.

Figure 3:
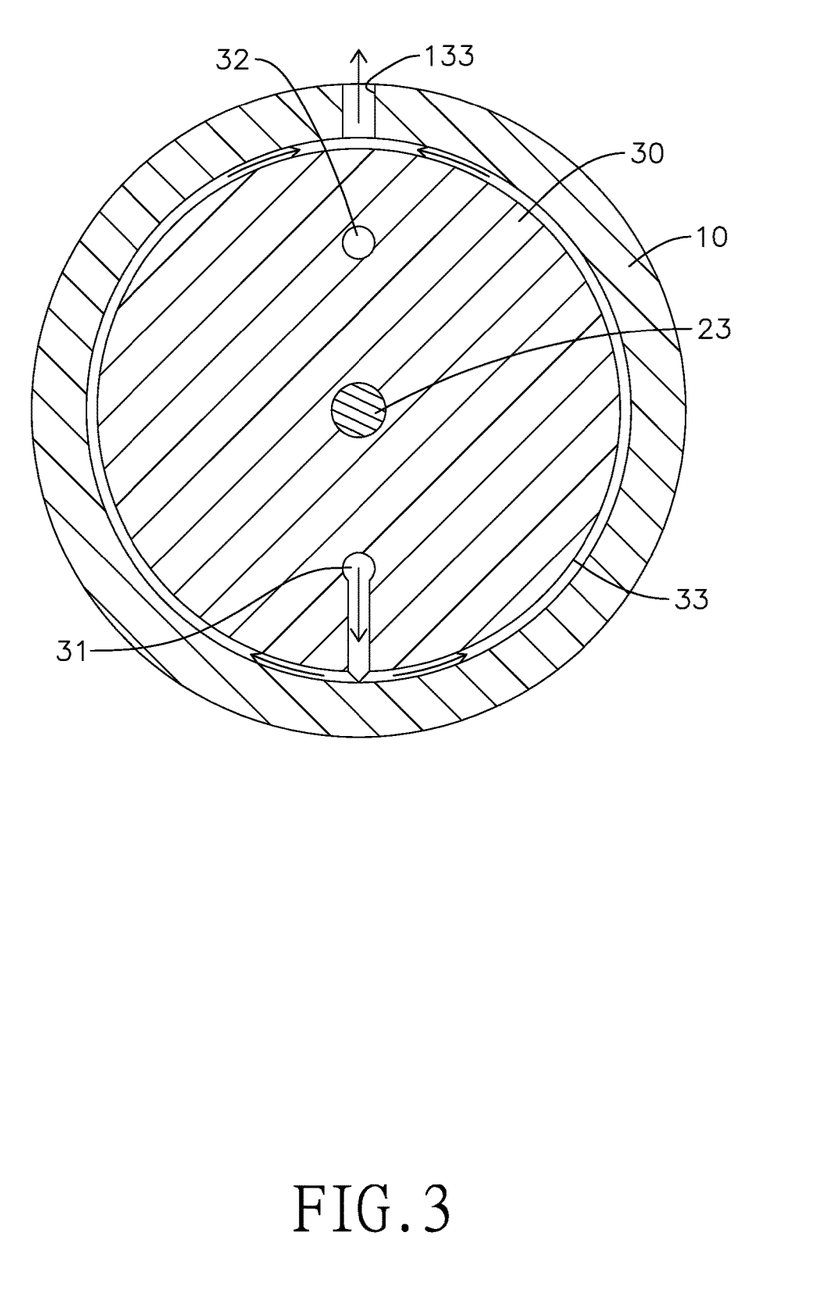
FIG. 3 is a sectional view of the tube, the two pistons, and the movable component.

With reference to FIGS. 2 to 4, the tube 10 is a cylinder. A first block portion 11 and a second block portion 12 protrude from an inner surface of the tube 10 and circularly extend along the tube 10, and the first block portion 11 and the second block portion 12 are spaced from each other in an axial direction of the tube 10. A first wastewater entrance 131, a second wastewater entrance 132, and a wastewater exit 133 are disposed through a side wall of the tube 10 in a radial direction of the tube and between the first block portion 11 and the second block portion 12. The wastewater exit 133 is further connected to a pipe for discharging wastewater. Two ends of the tube 10 in the axial direction are a first end 14 and a second end 15 respectively. A first inlet 141 and a first outlet 142 are disposed on the first end 14, and a second inlet 151 and a second outlet 152 are disposed on the second end 15. In this embodiment, the tube 10 comprises, but not limited to, a cylindrical body and two covers.

The first piston 21 is movably mounted in the tube 10 and between the first block portion 11 and the first end 14. The first piston 21 comprises a magnetic element 211 mounted on a surface of the first piston 21 that faces to the first block portion 11.

The second piston 22 is movably mounted in the tube 10 and between the second block portion 12 and the second end 15. The second piston 22 comprises a magnetic element 221 mounted on a surface of the second piston 22 that faces to the second block portion 12. The second piston 22 and the first piston 21 are connected to each other, and, in this embodiment, are connected by a rod 23. The magnetic element 211 of the first piston 21 and the magnetic element 221 of the second piston 22 are round discs and have equal cross-section areas, and the magnetic element 211 and the magnetic element 221 are mounted around the rod 23, but it is not limited thereto.

The movable component 30 is mounted in the tube 10 and between the first block portion 11 and the second block portion 12. The movable component 30 is movable in the axial direction and selectively abuts one of the first block portion 11 and the second block portion 12. The movable component 30 comprises magnetic elements 351, 352 mounted on two surfaces of two ends in an axial direction of the movable component 30 respectively. The magnetic elements 351, 352 respectively and selectively repulse the magnetic element 211 of the first piston 21 and the magnetic element 221 of the second piston 22. In this embodiment, the movable component 30 is movably mounted around the rod 23, which is between the pistons 21, 22, and the magnetic elements 351, 352 of the movable component 30 are round discs movable with respect to the rod 23 and are mounted around the rod 23, but it is not limited thereto. In this embodiment, the magnetic elements 211, 221, 351, 352 are magnets.

The movable component 30 makes the wastewater exit 133 of the tube 10 communicate with the first wastewater entrance 131 or the second wastewater entrance 132. In this embodiment, the movable component 30 comprises a first annular groove 33 and a second annular groove 34 concavely and circularly disposed on an inner cylindrical wall of the movable component 30, the two annular grooves 33, 34 are spaced from each other in the axial direction of the moveable component 30. The movable component 30 comprises a first passage 31 and a second passage 32. One end of the first passage 31 is formed on an axial surface of the movable component 30 that faces to the first end 14. The other end of first passage 31 is passed through the annular surface of the movable component 30 and communicates with the first annular groove 33. One end of the second passage 32 is formed on an axial surface of the movable component 30 that faces to the second end 15. The other end of the second passage 32 is passed through the annular surface of the movable component 30 and communicates with the second annular groove 34.

Please refer to FIG. 4. When the movable component 30 moves and abuts the first block portion 11 of the tube 10, the first annular groove 33 communicates with the wastewater exit 133 of the tube 10, the first passage 31 communicates with the wastewater exit 133 through the first annular groove 33, and the annular surface of the movable component 30 blocks the first wastewater entrance 131 of the tube 10. At this time, the second wastewater entrance 132 is not blocked.

Figure 6:
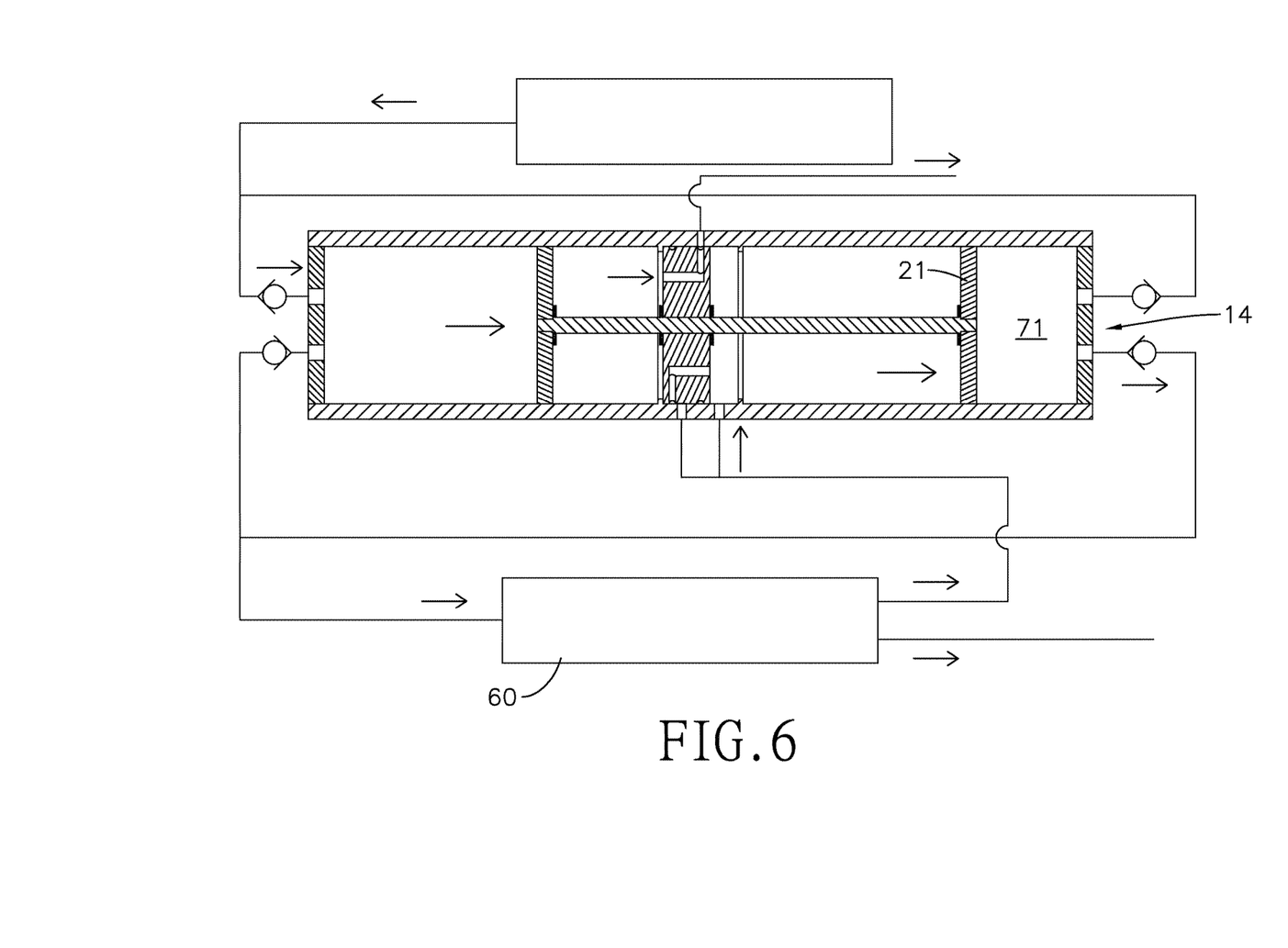
FIG. 6 is a sectional view of a third step of the process of using the water purifying system in FIG. 1.

Please refer to FIG. 6. When the movable component 30 moves and abuts the second block portion 12 of the tube 10, the second annular groove 34 communicates with the wastewater exit 133 of the tube 10, the second passage 32 communicates with the wastewater exit 133 through the second annular groove 34, and the annular surface of the movable component 30 blocks the second wastewater entrance 132 of the tube 10. At this time, the first wastewater entrance 131 is not blocked.

Please refer to FIG. 4. The check valves 41, 42, 43, 44 are a first check valve 41, a second check valve 42, a third check valve 43, and a fourth check valve 44 respectively. The first check valve 41 is connected to the first inlet 141 of the tube 10 by a pipe and only allows water to flow through the first inlet 141. The second check valve 42 is connected to the first outlet 142 of the tube 10 by a pipe and only allows water to flow out of the first outlet 142. The third check valve 43 is connected to the second inlet 151 of the tube 10 by a pipe and only allows water to flow through the second inlet 151. The fourth check valve 44 is connected to the second outlet 152 of the tube 10 by a pipe and only allows water to flow out of the second outlet 152.

An outlet of the pump 50 is connected to the first check valve 41 of the first inlet 141 and the third check valve 43 of the second inlet 151 by pipes in parallel. In this embodiment, the pump 50 is a high-pressure pump.

The filter 60 comprises an entrance 61, a filtrate exit 62, and a wastewater exit 63. The entrance 61 is connected to the second check valve 42 of the first outlet 142 and the fourth check valve 44 of the second outlet 152 by pipes in parallel. The filtrate exit 62 of the filter 60 is connected to another pipe for discharging filtrate. The wastewater exit 63 of the filter 60 is connected to the first wastewater entrance 131 and the second wastewater entrance 132 of the tube 10 by pipes in parallel. In this embodiment, the filter 60 is, but not limited to, a reverse osmosis filter.

When the present invention is used, the first piston 21, the second piston 22, and the movable component 30 separate the space in the tube 10 into a first space 71, a second space 72, a third space 73, and a fourth space 74. The first space 71 is between the first end 14 and the first piston 21, the second space 72 is between the second end 15 and the second piston 22, and the third space 73 is between the first piston 21 and the movable component 30, and the fourth space 74 is between the second piston 22 and the movable component 30.

When the present invention is in use, the pistons 21, 22 are in a static state, and the movable component 30 abuts the first block portion 11. The pump 50 drives the seawater or water into the first space 71 and the second space 72 respectively from the first inlet 141 and the second inlet 151. Then the seawater or water in the spaces 71, 72 flows into the filter 60 through the first outlet 142 and the second outlet 152 respectively so that the seawater or water is filtered and becomes pure water. The pure water is discharged from the filtrate exit 62. The high-pressure wastewater in the filter 60 flows to the fourth space 74 through the second wastewater entrance 132 of the tube 10, and pushes the second piston 22 toward the second end 15 and thereby energy is saved.

In addition, the first piston 21 is driven to move toward the second end 15 by the second piston 22. During the moving of the first piston 21, the third space 73 is gradually decreased, and wastewater in the third space 73 is discharged sequentially through the first passage 31, the first annular groove 33, and the wastewater exit 133 of the movable component 30. No matter what phase angle between the movable component 30 and the tube 10, the circular first annular groove 33 can make the first passage 31 and the wastewater exit 133 communicate with each other.

Figure 5:
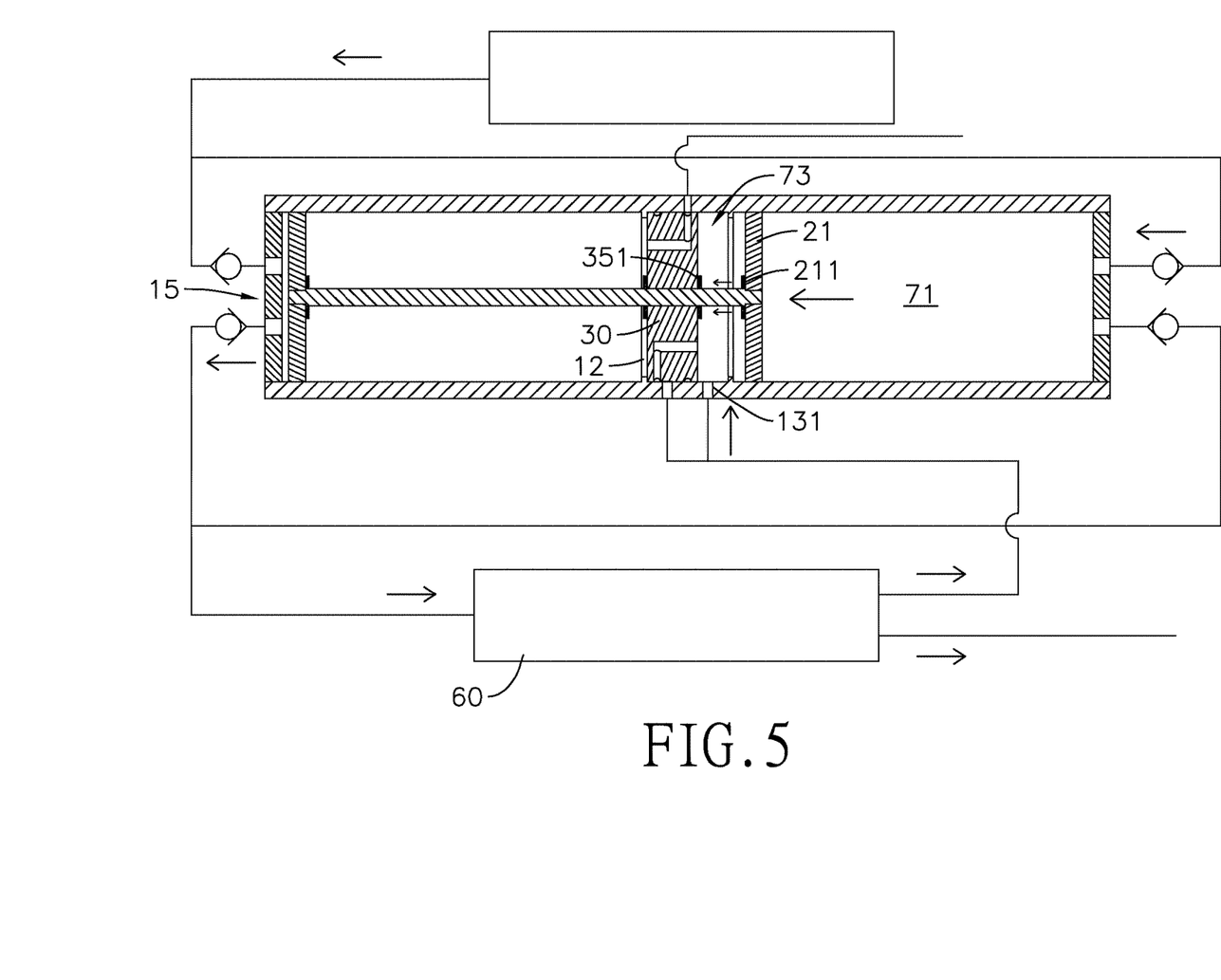
FIG. 5 is a sectional view of a second step of the process of using the water purifying system in FIG. 1.

Please refer to FIG. 5. When the first piston 21 moves to be adjacent to the movable component 30, the magnetic element 211 of the first piston 21 and the magnetic element 351 of the movable component 30 repulse each other so that the movable component 30 moves toward the second end 15 until abutting the second block portion 12. Meanwhile, high-pressure wastewater in the filter 60 flows into the third space 73 alternatively through the first wastewater entrance 131 of the tube 10 as shown in FIG. 6, and the high-pressure wastewater pushes the first piston 21 toward the first end 14. Thus, the present invention is switched in direction and alternatively drives wastewater in the first space 71 into the filter 60 for filtering.

Figure 7:
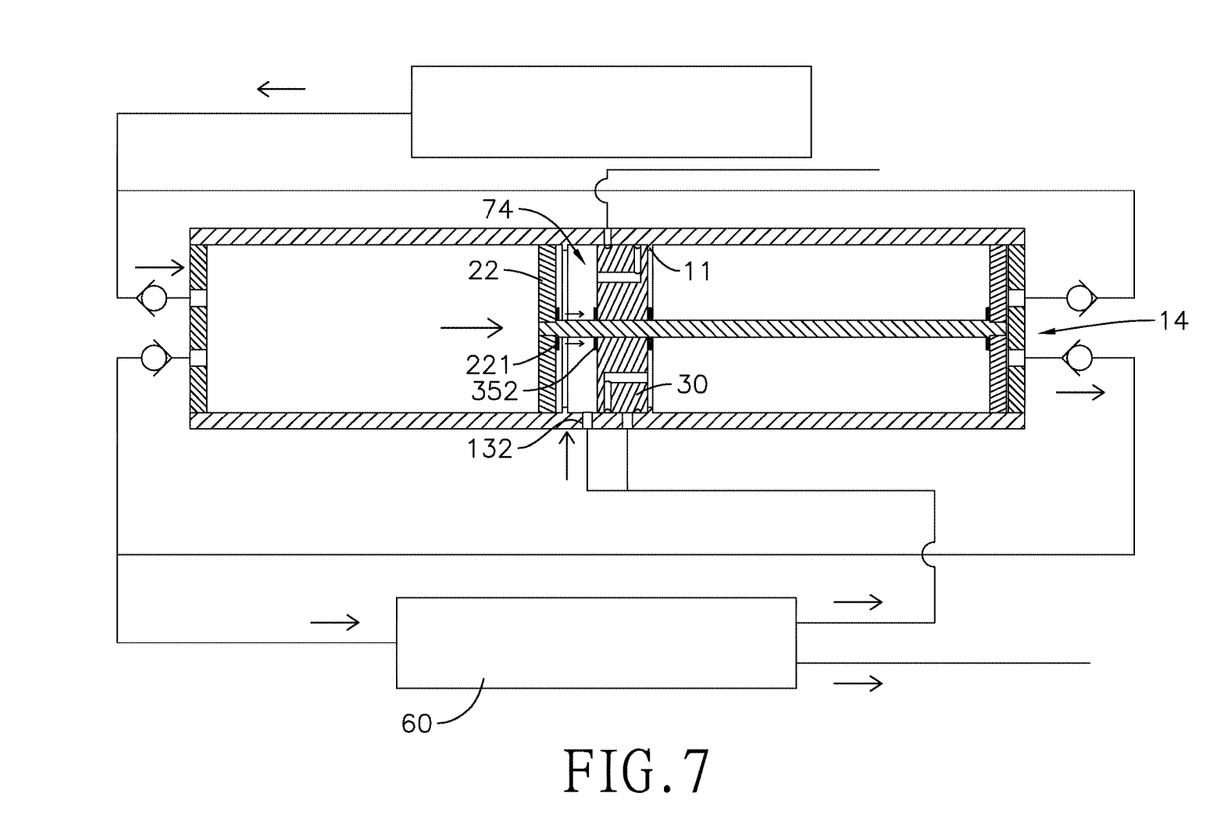
FIG. 7 is a sectional view of a fourth step of the process of using the water purifying system in FIG. 1.

Please refer to FIG. 7. Finally, when the second piston 22 is driven to be adjacent to the movable component 30, the magnetic element 221 of the second piston 22 and the magnetic element 352 of the movable component 30 repulse each other so that the movable component 30 moves toward the first end 14 until abutting on the first block portion 11. Meanwhile, high-pressure wastewater in the filter 60 flows into the fourth space 74 alternatively through the second wastewater entrance 132 of the tube as shown in FIG. 6, and the high-pressure wastewater pushes the second piston 22 toward the second end 15.

The present invention decreases an energy consumption of the pump 50 through the pistons 21, 22 by the high-pressure wastewater in the filter 60, and switches directions by repulsion of the magnetic force. Therefore, the structure of the present invention is simplified, thereby decreasing 70% energy consumption, lowering the cost, and reducing faults.

In another embodiment, the movable component may not comprise a first annular groove and a second annular groove, but only comprises a first passage and a second passage, as long as the phase angle between the movable component and the tube remains constant and outlets of the first and the second passages formed on the annular surface of the movable component are kept communicating with the wastewater exit of the tube.

In addition, the structure of the movable component also includes various types, as long as the first wastewater entrance or the second wastewater entrance of the tube can be selectively blocked and inner surfaces of the third space and the fourth space of the tube can discharge wastewater by mounting with a wastewater exit and check valves.

In another embodiment, the magnetic elements of the first piston, the second piston, and the movable component may not be round discs and may not be mounted around the rod and between the two pistons. The magnetic elements have various shapes and are mounted on an outer surface of the rod, as long as each one of the magnetic elements uniformly repulses another one of the magnetic elements of other components.

In still another embodiment, the first block portion and the second block portion may not circularly extend along the inner surface of the tube. Instead, the first block portion and the second block portion can comprise a plurality of protrusions for being abutted by the movable component or another component, as long as the stroke of the movable component is restricted.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An energy-saving water purifying system comprising:
    a tube comprising:
        a first block portion protruding from an inner surface of the tube;
        a second block portion protruding from the inner surface of the tube and spaced from the first block portion in an axial direction of the tube;
        a first wastewater entrance disposed through a side wall of the tube in a radial direction of the tube and between the first block portion and the second block portion;
        a second wastewater entrance disposed through the side wall in the radial direction and between the first block portion and the second block portion;
        a first inlet disposed at a first end of the tube;
        a first outlet disposed at the first end of the tube;
        a second inlet disposed at a second end of the tube which is opposite the first end of the tube; and a second outlet disposed at the second end of the tube;
a first piston movably mounted between the first block portion and the first end, the first piston comprising
a magnetic element mounted on a surface of the first piston that faces to the first block portion;
a second piston movably mounted between the second block portion and the second end and comprising
a magnetic element mounted on a surface of the second piston that faces to the second block portion;
a movable component movably mounted between the first block portion and the second block portion, selectively abutting the first block portion or the second block portion, and selectively blocks the first wastewater entrance or the second wastewater entrance; the movable component comprising
two magnetic elements mounted on two surfaces of two ends in an axial direction of the movable component respectively and selectively repulsed by the magnetic element of the first piston or the magnetic element of the second piston;
a rod connected to the first piston and the second piston and movably passed through the movable component;
four check valves respectively connected to the first inlet, the first outlet, the second inlet, and the second outlet by respective connecting conduits;
a pump comprising
an outlet connected to the check valves of the first inlet and the second inlet in parallel by a pump conduit; and
a filter comprising
an entrance connected to the check valves of the first outlet and the second outlet in parallel by a filter conduit;
a filtrate exit; and
a wastewater exit connected to the first wastewater entrance and the second wastewater entrance of the tube in parallel by a wastewater conduit;
wherein when the movable component abuts the first block portion, the movable component blocks the first wastewater entrance, and wastewater in the filter flows into a space between the movable component and the second piston via the second wastewater entrance, thereby the wastewater pushing the first piston and the second piston to move toward the second end of the tube;
wherein when the movable component abuts the second block portion, the movable component blocks the second wastewater entrance, and wastewater in the filter flows into a space between the movable component and the first piston via the first wastewater entrance, thereby pushing the first piston and the second piston to move toward the first end of the tube.

2. The energy-saving water purifying system as claimed in claim 1, wherein
the tube comprises
a wastewater exit disposed through the side wall of the tube in the radial direction of the tube;
the wastewater exit of the tube is between the first block portion and the second block portion;
the movable component comprises a first passage, one end of the first passage formed in one of two axial surfaces of the movable component that faces to the first end, another end of the first passage passed through an inner cylindrical wall of the movable component in the radial direction; wherein when the movable component is moved and abuts the first block portion, the first passage communicates with the wastewater exit of the tube, and the movable component blocks the first wastewater entrance of the tube;
a second passage, one end of the second passage formed in another one of the two axial surfaces of the movable component which faces to the second end, another end of the second passage passed through the inner cylindrical wall of the movable component in the radial direction; wherein when the movable component is moved and abuts the second block portion, the second passage communicates with the wastewater exit of the tube, and the movable component blocks the second wastewater entrance of the tube.

3. The energy-saving water purifying system as claimed in claim 2, wherein the movable component comprises
a first annular groove concavely and circularly disposed on the inner cylindrical wall of the movable component and communicating to the first passage; and
a second annular groove concavely and circularly disposed on the inner cylindrical wall of the movable component, spaced form the first annular groove in the axial direction, and communicating to the second passage; wherein
when the movable component is moved and abuts the first block portion, the first annular groove communicates with the wastewater exit of the tube; and
when the movable component is moved and abuts the second block portion, the second annular groove communicates with the wastewater exit of the tube.

4. The energy-saving water purifying system as claimed in claim 3, wherein each one of the magnetic elements of the first piston and the second piston is mounted around the rod, and the magnetic elements of the movable component are movably mounted around the rod and are moveable relative to each other.

5. The energy-saving water purifying system as claimed in claim 4, wherein each one of the first block portion and the second block portion of the tube is formed in an annular shape on the inner surface of the tube.

6. The energy-saving water purifying system as claimed in claim 5, wherein the filter is a reverse osmosis filter.

7. The energy-saving water purifying system as claimed in claim 1, wherein each one of the magnetic elements of the first piston and the second piston is mounted around the rod, and the magnetic elements of the movable component are movably mounted around the rod and are moveable relative to each other.

8. The energy-saving water purifying system as claimed in claim 1, wherein each one of the first block portion and the second block portion of the tube is formed in an annular shape on the inner surface of the tube.

9. The energy-saving water purifying system as claimed in claim 1, wherein the filter is a reverse osmosis filter.

* * * * *